(12) United States Patent  (10) Patent No.: US 9,025,022 B2
Huang et al.  (45) Date of Patent: May 5, 2015

(54) METHOD AND APPARATUS FOR GESTURE RECOGNITION USING A TWO DIMENSIONAL IMAGING DEVICE

(71) Applicant: Sony Corporation, Tokyo (JP)

(72) Inventors: Kuang-Man Andy Huang, Taipei (TW); Ming-Chang Liu, San Jose, CA (US); Wei Ji, San Jose, CA (US)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/660,150

(22) Filed: Oct. 25, 2012

(65) Prior Publication Data

US 2014/0118535 A1  May 1, 2014

(51) Int. Cl.
*H04N 7/18* (2006.01)
*H04N 13/02* (2006.01)
*H04N 5/225* (2006.01)
*H03K 17/94* (2006.01)
*G06F 3/033* (2013.01)
*G09G 5/00* (2006.01)
*G06K 9/00* (2006.01)
*G01S 3/80* (2006.01)
*G06F 17/00* (2006.01)
*H04R 3/00* (2006.01)

(52) U.S. Cl.
CPC ................................ *G06K 9/00335* (2013.01)

(58) Field of Classification Search
CPC . G06K 9/00335; G06K 9/00355; G06K 9/00; G06K 9/00382; G06K 9/00389; G06K 2009/00395; G06K 9/00362; G06K 9/00375; G06T 7/20; G06F 3/00; G06F 3/017; G06F 17/30032
USPC ......... 348/135, 77, 46, 169; 341/20; 715/863; 345/156, 158; 382/103; 367/118; 700/94; 381/92
See application file for complete search history.

(56) References Cited

U.S. PATENT DOCUMENTS

2012/0200494 A1* 8/2012 Perski et al. .................. 345/156
2013/0034265 A1* 2/2013 Nakasu et al. ................ 382/103
2013/0088429 A1* 4/2013 Yang ............................. 345/158
2013/0159940 A1* 6/2013 Duffy et al. ................... 715/863

FOREIGN PATENT DOCUMENTS

WO  WO 2012091185 A1 *  7/2012

* cited by examiner

*Primary Examiner* — Sath V Perungavoor
*Assistant Examiner* — Xiaolan Xu
(74) *Attorney, Agent, or Firm* — Moser Taboada

(57) ABSTRACT

Certain aspects of an apparatus and method for gesture recognition using a two Dimensional (2D) imaging device may include capturing a first image of a hand in a first position, capturing a second image of the hand in a second position, generating an image mask for indicating the movement of the arm from the first position to the second position, determining an elbow position corresponding to the hand based on the image mask and estimating the change in depth of the hand from the first position to the second position based on the determined elbow position.

20 Claims, 12 Drawing Sheets

METHOD AND APPARATUS FOR GESTURE RECOGNITION USING A TWO DIMENSIONAL IMAGING DEVICE

FIELD

Certain embodiments of the disclosure relate to gesture recognition. More specifically, certain embodiments of the disclosure relate to a method and apparatus for gesture recognition using a two dimensional (2D) imaging device.

BACKGROUND

Conventional user interfaces (UIs) limit user input to input received from control devices such as a keyboard, a mouse and the like. One solution to the limitation of input modalities and devices in connection with conventional UIs is accepting gestures as input and performing recognition on those gestures. Gesture recognition provides a more direct interaction between human and machine as compared with conventional UIs. Gesture recognition associates spatial and temporal information and can replace traditional control devices in future UI applications.

The ability to track human movements and determine performed gestures can be achieved through various solutions or tools. Although a plethora of research has been performed in image/video based gesture recognition area, there is variation within the tools and environments used in various implementations. Some solutions use specialized depth-aware cameras, such as structured light or time-of-flight (TOF) cameras. The structured light cameras generate a depth map of scenes or objects seen through the camera at a short range. The depth map is used to approximate a 3D representation of the scenes or objects viewed through the structured light cameras. However, the structured light cameras are only effective for detection of hand gestures due to their short range capabilities. MICROSOFT® has developed a 3D sensor KINECT® for XBOX 360® games. However, the KINECT® creates a depth image, which contains depth information of objects in the environment to help accurately predict 3D positions of user body joints. Other solutions use stereo cameras, such using a pair of cameras whose relations to one another are known, a 3D representation can be approximated by the output of the cameras. The use of a stereo camera in combination with direct motion measurement of a user's body motion, aids in capturing gestures for detection and recognition. Therefore, although there are methods to detect gestures using three-dimensional imaging systems such as KINECT® and the like, there is no simple way to detect a gesture that is three-dimensional in nature through the use of a two dimensional imaging device.

Therefore there is a need in the art for an efficient method and apparatus for gesture recognition using a two dimensional (2-D) imaging device.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for gesture recognition using a 2 dimensional (2D) imaging device substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Embodiments of the disclosure relate to an apparatus and/or method for recognizing an arm gesture using a two-dimensional (2D) imaging device. According to one embodiment, a first image of an arm in a first position is captured. A second image of a push gesture of the arm in a second position is captured. Skin color and motion information are used in combination to segregate a hand area from the arm, body, and background image data in each of the first and second images. A difference image is generated between the first and second images. An image mask for indicating movement of the arm is computed using the difference between the first and second images, and the difference is convolved using a circle filter for noise reduction. The first and second images are processed to remove errors in the distance between the hand and the elbow due to shadow. The distance between the hand and the elbow is computed to estimate the push level distance of the push gesture. Over time, successive changes in the computed hand to elbow distance indicate further details of the push gesture as an aid to gesture recognition.

Figure 1:
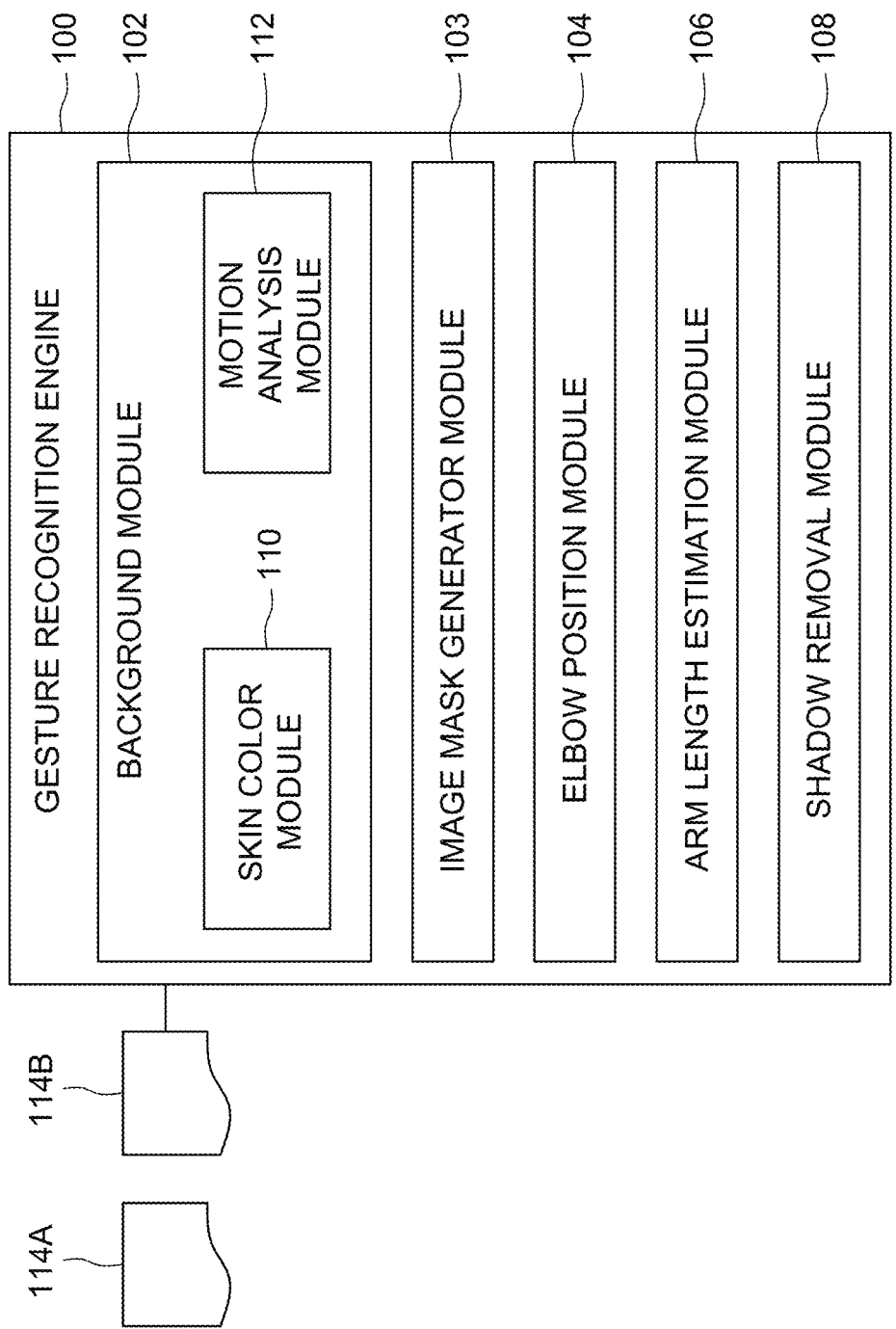
FIG. 1 is a block diagram illustrating a gesture recognition engine, in accordance with an embodiment of the disclosure.

FIG. 1 is a block diagram illustrating a gesture recognition engine 100, in accordance with an embodiment of the disclosure. The gesture recognition engine 100 comprises a background model generator module 102, an image mask generator module 103, an elbow position module 104, an arm length estimation module 106 and a shadow removal module 108. The background module 102 comprises a skin color module 110 and a motion analysis module 112.

The gesture recognition engine 100 takes input images, for example a first image 114A and a second image 114B depicting an arm in a first and a second position respectively. According to one embodiment, the gesture recognition engine 100 is directly coupled to a 2D camera, or other image capturing device, so as to receive images 114A and 114B as input for processing in accordance with the following description.

Figure 2:
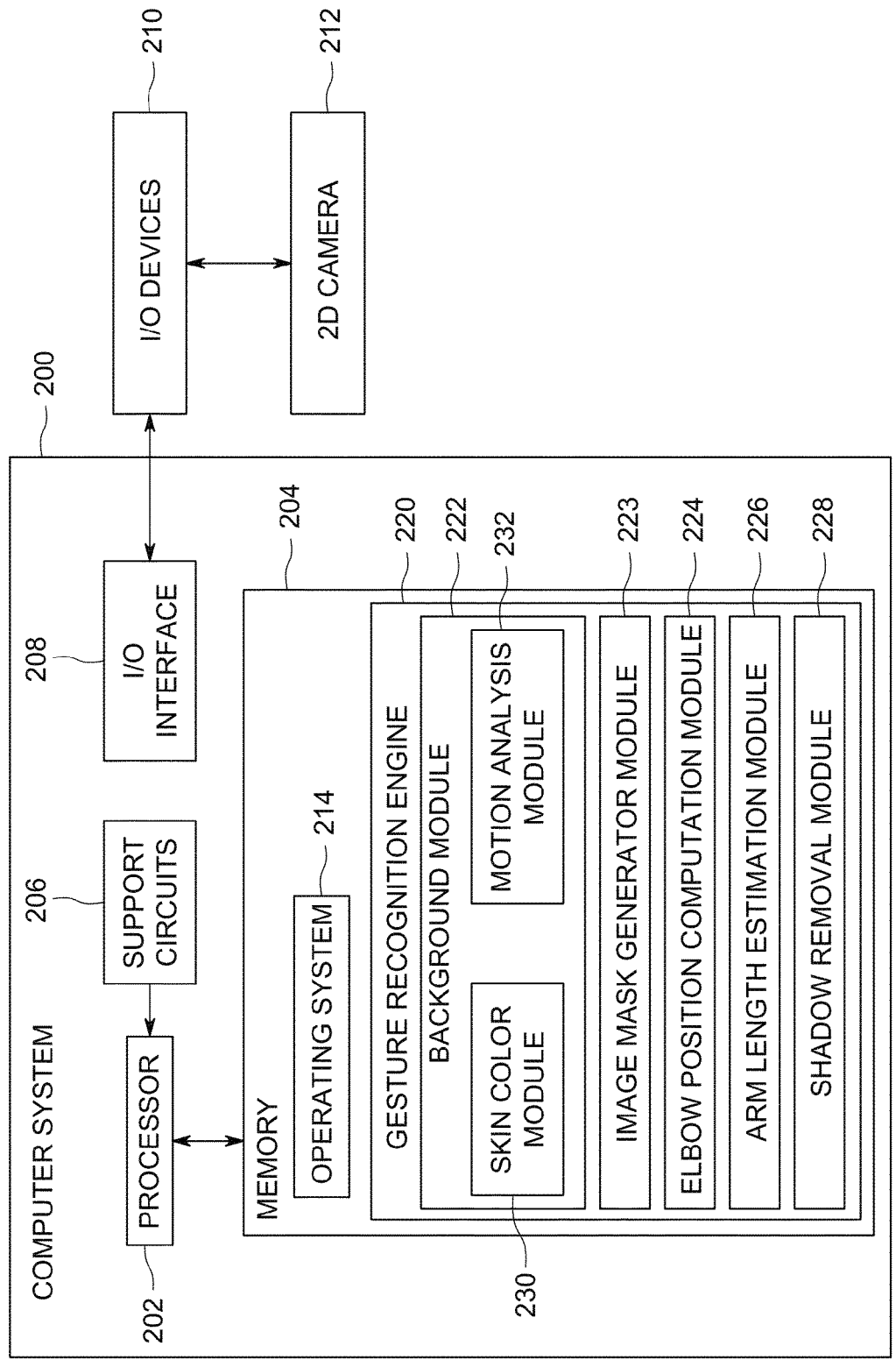
FIG. 2 is a block diagram of a computer system for implementing the gesture recognition engine in accordance with embodiments of the present invention.

FIG. 2 is a block diagram of a computer system 200 for implementing the gesture recognition engine 100 in accordance with embodiments of the present invention. The computer system 200 includes a processor 202, a memory 204, various support circuits 206 and an input/output (I/O) interface 208. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, and the like. The I/O interface 208 may be directly coupled to the memory 204 or coupled through the supporting circuits 206. The I/O interface 208 may also be configured for communication with input devices and/or output devices 210, such as, network devices, various storage devices, mouse, keyboard, displays, sensors, cameras and the like. In some embodiments, at least one of the input devices and/or output devices 210 is coupled to a 2-D imaging device 212. In some embodiments, the 2D imaging device 212 is a 2D camera.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprises the gesture recognition engine 220, further comprising the background module 222, a image mask generator module 223, an elbow position computation module 224, an arm length estimation module 226 and a shadow removal module 228. The background model generator module 222 comprises a skin color module 230 and a motion analysis module 232.

The computer system 200 may be programmed with one or more operating systems (generally referred to as operating system (OS) 214, which may include OS/2, JAVA Virtual Machine, LINUX, SOLARIS, UNIX, HPUX, AIX, WINDOWS, WINDOWS 95, WINDOWS 98, WINDOWS NT, WINDOWS 2000, WINDOWS ME, WINDOWS XP, and WINDOWS 7, among other known platforms. At least a portion of the operating system 214 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like. Details concerning the method of operation of the modules of FIG. 2 are provided next, and in particular in conjunction with the flow diagrams and illustrations of FIGS. 3-11.

Figure 3:
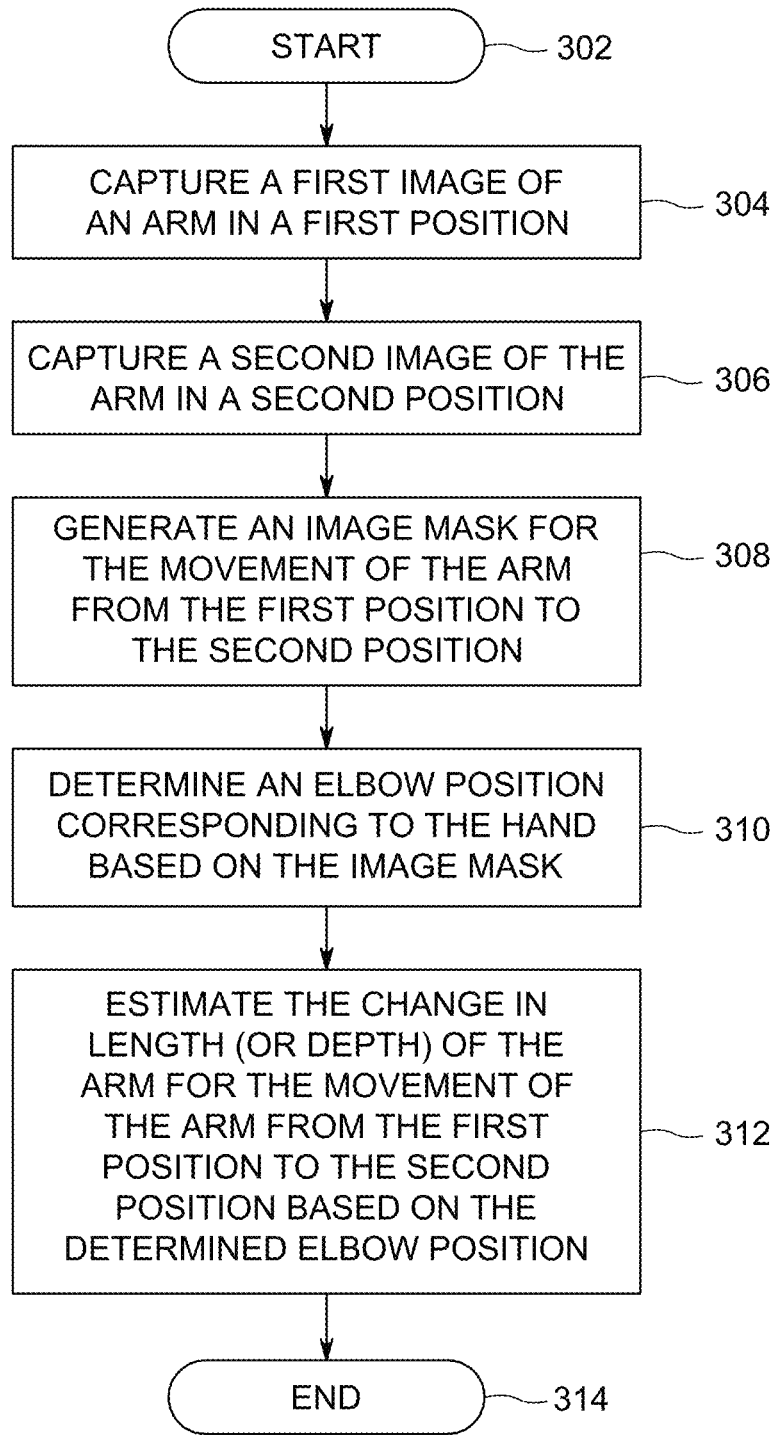
FIG. 3 is an illustration of a flow diagram for a method for gesture recognition using a 2D imaging device according to exemplary embodiments of the present invention.

FIG. 3 is an illustration of a flow diagram for a method 300 for gesture recognition using a 2D imaging device according to exemplary embodiments of the present invention. The method 300 is an implementation of the gesture recognition engine 100 shown in FIG. 1, implemented as the gesture recognition engine 220 executed by the processor 202. The method begins at step 302 and proceeds to step 304.

At step 304, the 2D camera 212 captures a first image of an arm in a first position. In some embodiments, a hand of the arm is in an upright (or vertical) pose in the first position.

At step 306, the 2D camera 212 captures a second image of the arm in a second position. In some embodiments, the arm is in a stretched horizontal pose in the second position, and the hand is still significantly upright. The background module 222 separates the background of the image from the arm depicted in the image by receiving and processing the captured first and second images.

The method then proceeds to step 308, where an image mask for indicating movement of the arm from the first position to the second position is generated by the image mask generator module 223. The image mask gives an indication of the arm movement because the hand generally remains in the same position, and is only slightly changed in shape/scale.

At step 310, the elbow position computation module 224 determines an elbow position with reference to a given portion the hand (such as the base of the hand) based on the image mask generated by the image mask generator module 223. The elbow position is determined to be the lowest point in the image mask. In some embodiments, the image mask is processed before the elbow position is determined, so as to take into account the possibility of the existence in the image mask of a shadow of the arm, as further described in conjunction with FIGS. 7A, 7B, 8, 10 and 11.

At step 312, the arm length and depth estimation module 226 estimates the change in length and depth of the arm for the indicated movement of the arm from the first position to the second position, based on the determined elbow position. The change in length of the arm and depth of the elbow indicates the "push level" (that is, a sweeping distance) of the gesture. According to some embodiments, different push levels can be used to represent different functions in software, or may indicate a length of time of delay the imaging device should take before capturing a photograph. The method 300 terminates at step 314.

Figure 4:
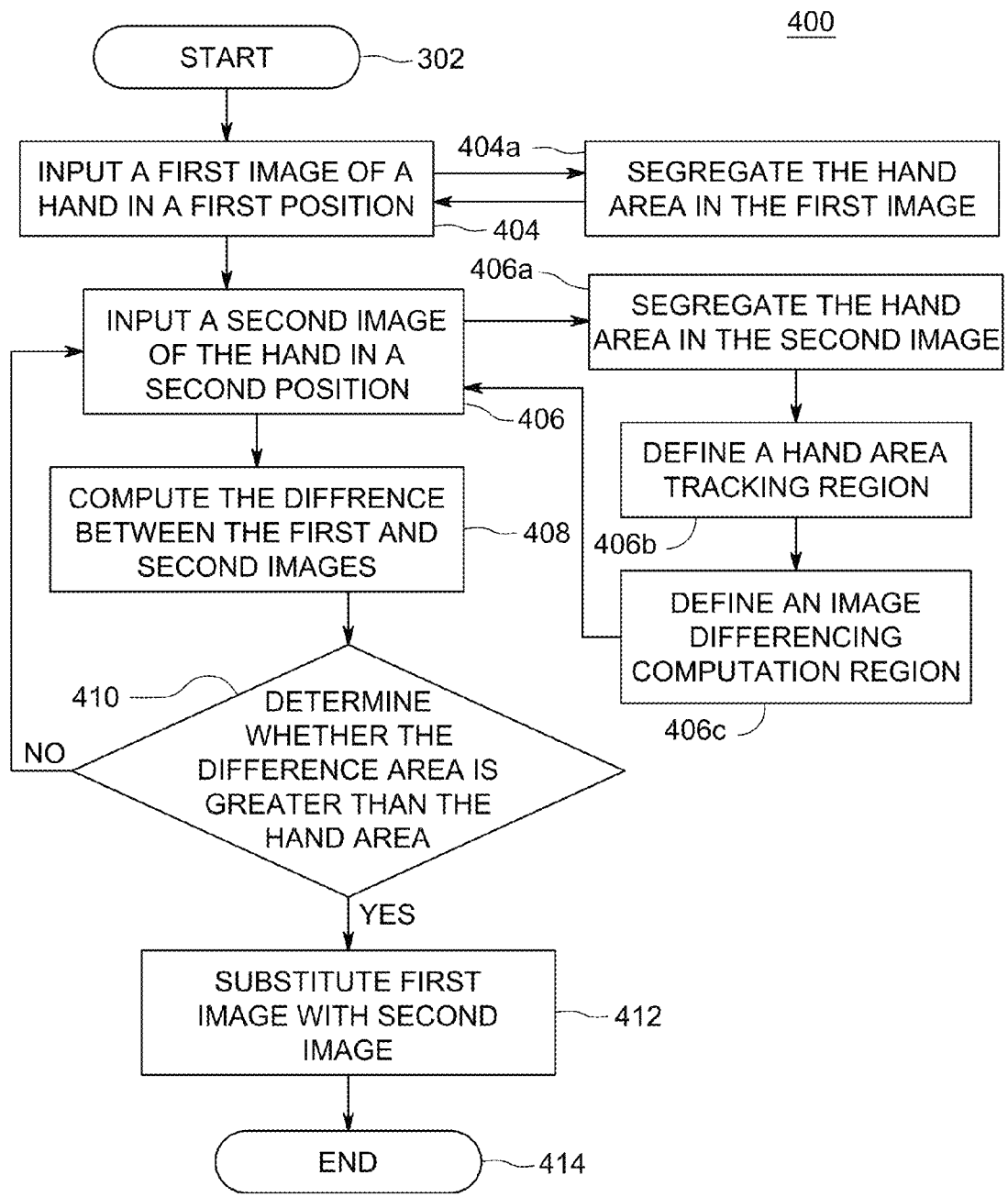
FIG. 4 is an illustration of a flow diagram for a method for generating and initializing a background model according to exemplary embodiments of the present invention.

FIG. 4 is an illustration of a flow diagram for a method for detecting a background of the image according to exemplary embodiments of the present invention. The method 400 is an implementation of the background module 102 shown in FIG. 1, implemented as the module 222 executed by the processor 202. The method 400 begins at step 402 and proceeds to step 404.

At step 404, the background model generator module 222 receives a first input image, i.e., a first image of an arm in a first position, for example in an upright pose. Within step 404, the method 400 performs step 404a wherein the method 400 segregates a hand area in the first image using a combination of the skin color model 230 and the motion information obtained from the motion analysis module 232.

At step 406, the background module 222 receives a second input image, i.e., a second image of an arm in a second position, for example in a stretched horizontal pose. Within step 406, the method 400 performs step 406a wherein the method 400 segregates the hand area in the second image using the skin color model 230 with the motion information obtained from the motion analysis module 232. Within step 406, the method 400 performs step 406b wherein the method 400 defines a hand area tracking region having an area $L^2$, where L is a detected hand length, for the segregated hand area in each of the first and second images. Within step 406, the method 400 further performs step 406c wherein image differencing computation regions are defined having an area $4L^2$ (or length 2 L and height 2 L) for the difference area computation from a difference image of the first image and the second image.

At step 408, the method 400 computes the difference in the first and second images, i.e. the difference area confined to the image differencing computation region in the difference image.

At step 410, the method 400 determines whether the difference area confined to the image differencing computation region is greater than the hand area confined to the hand area tracking region.

If, at step 410 the method 400 determines the difference area confined to the second region is not greater than the hand area confined to the first region, i.e. the output is "NO", therefore a new "first" image need not be captured and the method returns to step 406. If, at step 410, the method 400 determines the difference area confined to the image differencing computation region is greater than the hand area confined to the hand area tracking region, i.e. the output is "YES", the method proceeds to step 412. At step 412, the method 400 substitutes the first image with the second image as a new "first" image. In some embodiments, the hand area is calculated with the hand held stationary for at least a predetermined instant of time, for instance, 0.2 seconds. The method 400 proceeds to step 414 and ends.

Figure 5:
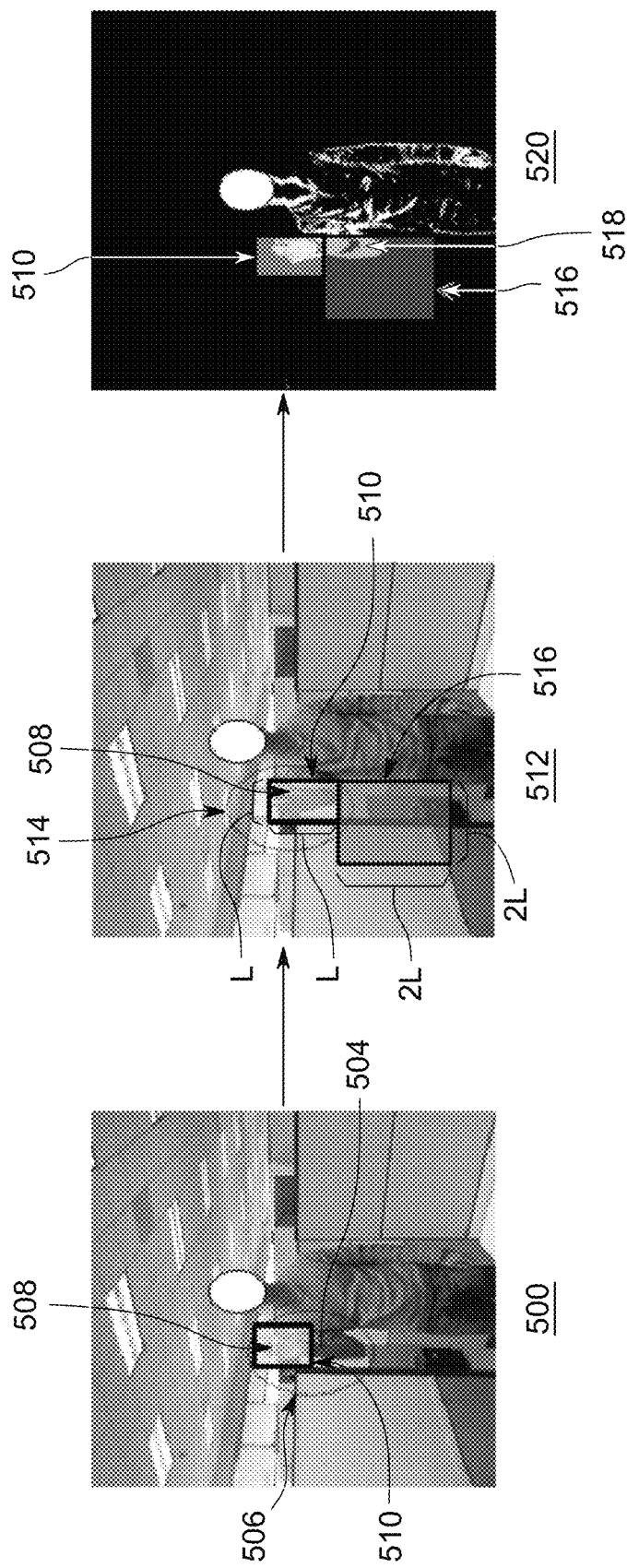
FIG. 5 illustrates an example first image of a hand in a first position, an example second image of the hand in a second position and an example first difference image generated as a background model image.

FIG. 5 illustrates an example first image 500 of an arm in a first position, an example second image 512 of the arm in a second position and an example first difference image 520 comprising a background model.

The first image 500 is captured using a 2D camera. The first image 500 comprises an arm 504 in a first position 506. In some embodiments, the arm 504 is in an upright pose. The first image 500 also comprises a hand area 508 segregated from the rest of the first image 500. The segregated hand area 508 is confined to a first instance of a hand area tracking region 510 having an area $L^2$ of length L and height L, where L is the detected hand length L.

The second image 512 is captured using the 2D camera. The second image 512 comprises the arm 504 in a second position 514. In some embodiments, the hand 504 is in a stretched horizontal pose in the second position 514. The second image 512 also comprises the hand area 508 segregated from the rest of the second image 512. The segregated hand area 508 is confined to a second instance of the hand area tracking region 510 having an area $L^2$ of length L and height L, where L is the detected hand length. The second image 512 also comprises a first instance of an image differencing computation region 516 having an area $4L^2$ of length 2 L and height 2 L, for computing the difference between the example first and second images 500 and 512. The difference image 520 comprises a the image differencing computation region 516, the hand area tracking region 510 and a difference area 518 of the first image 500 and the second image 512, collectively comprising an initial background model.

Figure 6:
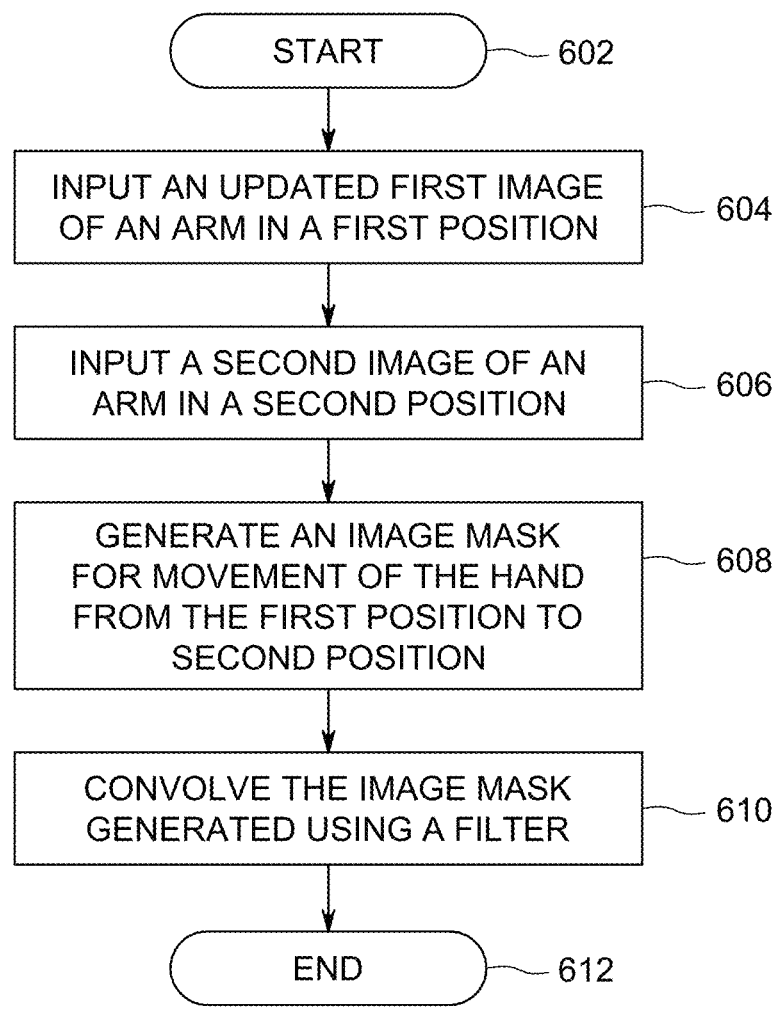
FIG. 6 is an illustration of a flow diagram for a method 600 for generating an image mask for indicating movement of the arm according to exemplary embodiments of the present invention.

FIG. 6 is a flow diagram for a method 600 for generating an image mask for indicating movement of the arm according to exemplary embodiments of the present invention. The method 600 is an implementation of the image mask generator module 103 shown in FIG. 1, implemented as the image mask generator module 223 executed by the processor 202. The method 600 begins at step 602 and proceeds to step 604.

At step 604, the method 600 receives as a first input an updated first image of an arm in an updated first position, for example a first image of a hand in an upright (or vertical) pose is substituted with a second image of the hand in a stretched horizontal pose as an updated (or new) first image. This new first image will serve as a new background image.

At step 606, the method 600 receives as a second input a new second image of an arm in a second position, for example an image of the arm in an upright (or vertical) position.

The method 600 proceeds to step 608. At step 608, the image mask generator module 223 generates an image mask for indicating movement of the arm, i.e. the forearm comprising the portion from the hand to the elbow, between one position to another, for example the updated first position and the new second position. In some embodiments, the image mask generator module 223 generates the image mask using the updated first image of the hand in the updated first position and the new second image of the hand in the new second position.

At step 610, the method 600 convolves the image mask generated by the image mask generator module 223 using a filter to remove noisy pixels and obtain a noise filtered image mask. The method 600 terminates at step 612.

Figure 7A:
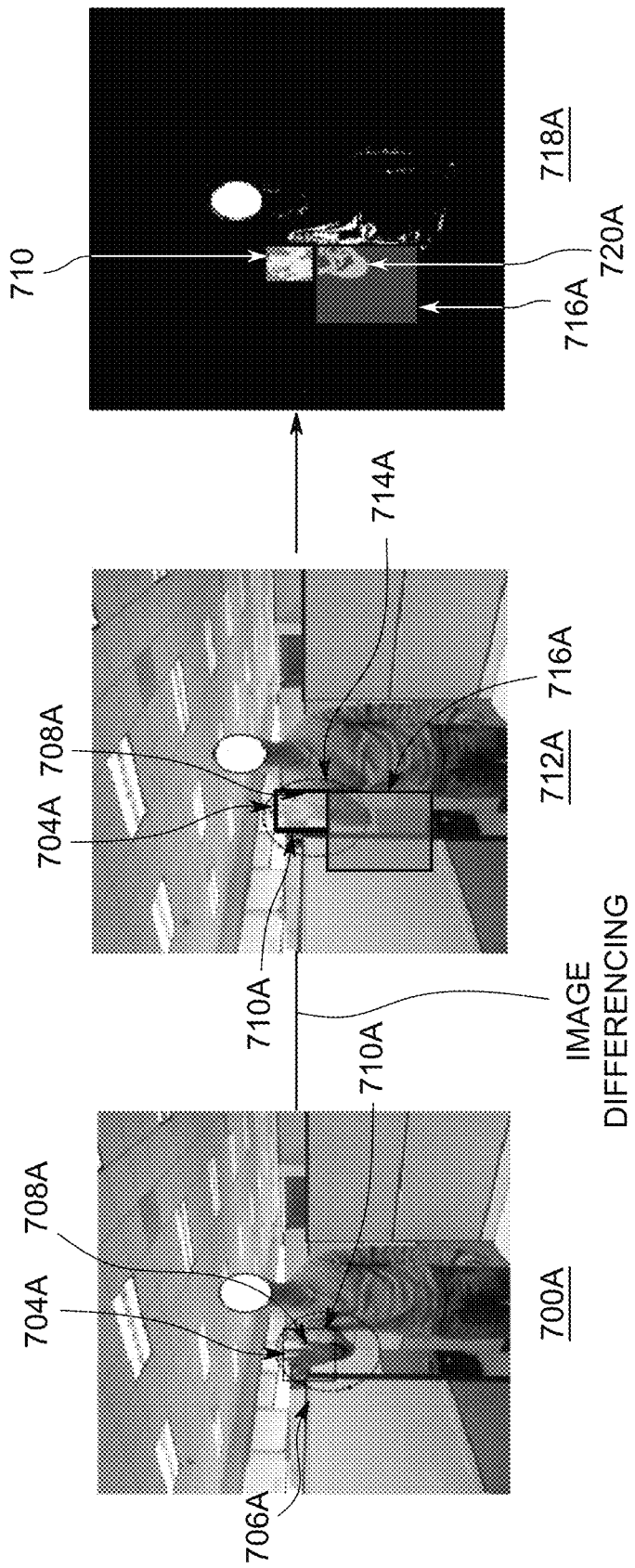
FIG. 7A illustrates generation of an example image mask for indicating movement of the arm according to the method of FIG. 6.

FIG. 7A illustrates an updated first image 700A of an arm in an updated first position 706A, a new second image 712A of the arm in a new second position 714A and a second difference image 718A used in generation of an example image mask for indicating movement of the arm according to the method of FIG. 6.

An example updated first image 700A comprises a hand 704A in an updated first position 706A. In some embodiments, the hand 704A is in a stretched horizontal pose in the updated first position 706A. The example updated first image 700A also comprises a hand area 708A segregated from the rest of the example updated first image 700A. The segregated hand area 708A is confined to a first instance of a hand area tracking region 710A, i.e., a tracking area $L^2$ of length L and height L, where L is the detected hand length L.

The new second image 712A comprises the hand 704A in a new second position 714A. In some embodiments, the hand 704A is in a folded upright (or vertical) pose in the new second position 714A. The new second image 712A also comprises the hand area 708A segregated from the rest of the new second image 712A. The segregated hand area 708A is confined to a second instance of the hand area tracking region 710A, i.e., a tracking area $L^2$ of length L and height L, where L is the detected hand length. The new second image 712A also comprises a first instance of an image differencing computation region 716A, i.e. an area $4L^2$ of length 2 L and height 2 L, for computation of a difference area between the updated first and new second images 700A and 712A. A second difference image 718A comprises a third instance of the hand area tracking region 710A, a second instance of the image differencing computation region 714A and an image mask 720A (corresponding to the image differencing computation region 716A), for indicating movement of the arm from the updated first position 706A to the second new position 714A.

Figure 7B:
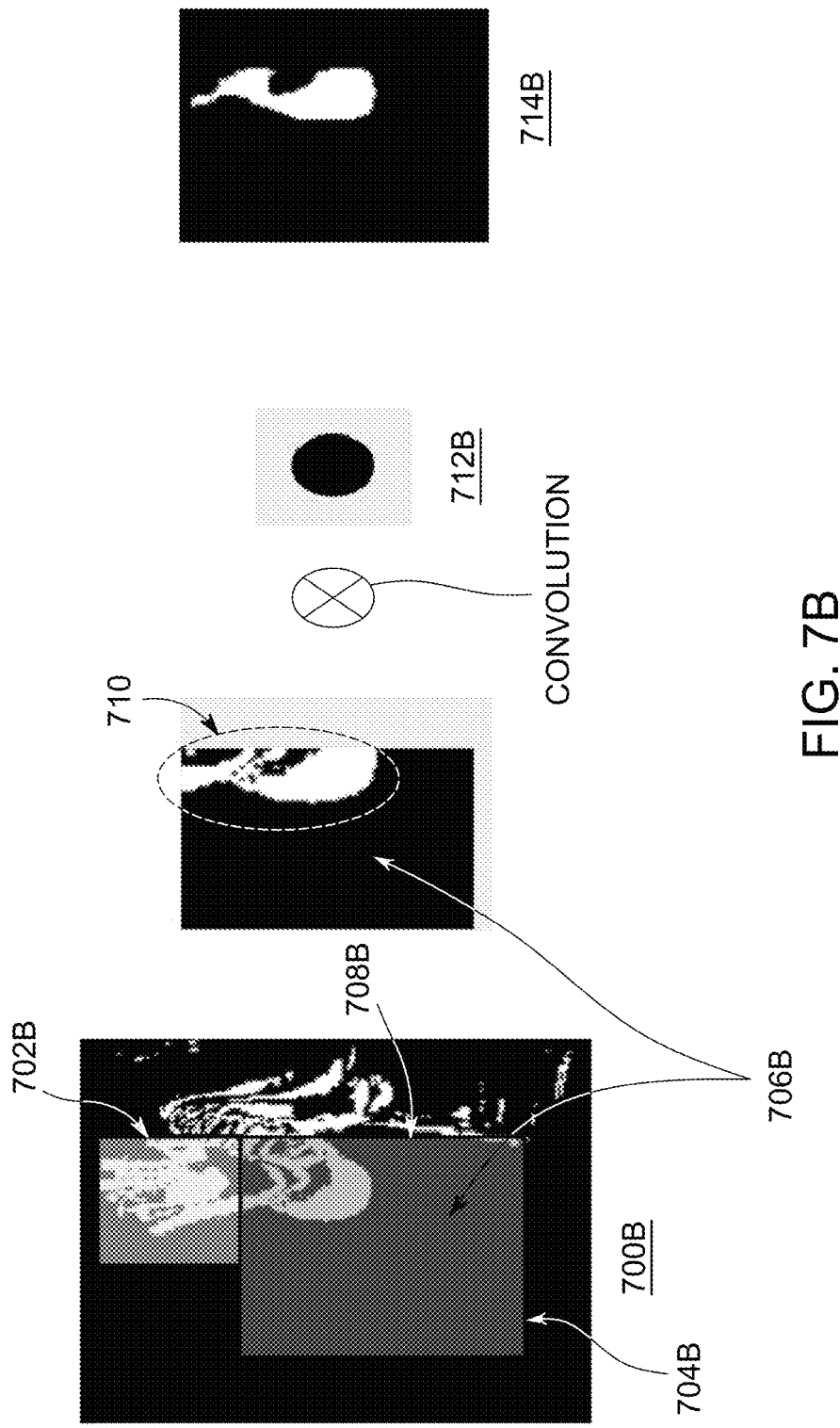
FIG. 7B illustrates generation of an example noise filtered image mask by convolving the image mask generated in FIG. 7A with an example circle filter according to exemplary embodiments of the present invention.

FIG. 7B illustrates generation of a noise filtered third difference image from the image mask 720A of FIG. 7A, comprising an example circle filter (for noise filtering) and an example filtered image mask according to exemplary embodiments of the present invention.

The difference image 700B comprises a hand area tracking region 702B, having an area $L^2$, where L is the detected hand length, and a image differencing computation region 704B having an area 4 L² (or length 2 L and height 2 L), both regions taken from, for example, image mask 720A. The image differencing computation region 704B is divided into a first area 706B and a second area 708B. The first area 706B comprises an image mask 710B to be used for indicating movement of the arm. The second area 708B comprises a remnant. In some embodiments, the first area 706B has an area 1.5 L*2 L, whereas the second area 708B has an area 0.5 L*2 L. The first area 706B comprising the image mask 710B is convolved using a noise reduction filter 712B to obtain a filtered image mask 714B. In some embodiments, the filter 712B is a circle filter.

Figure 8:
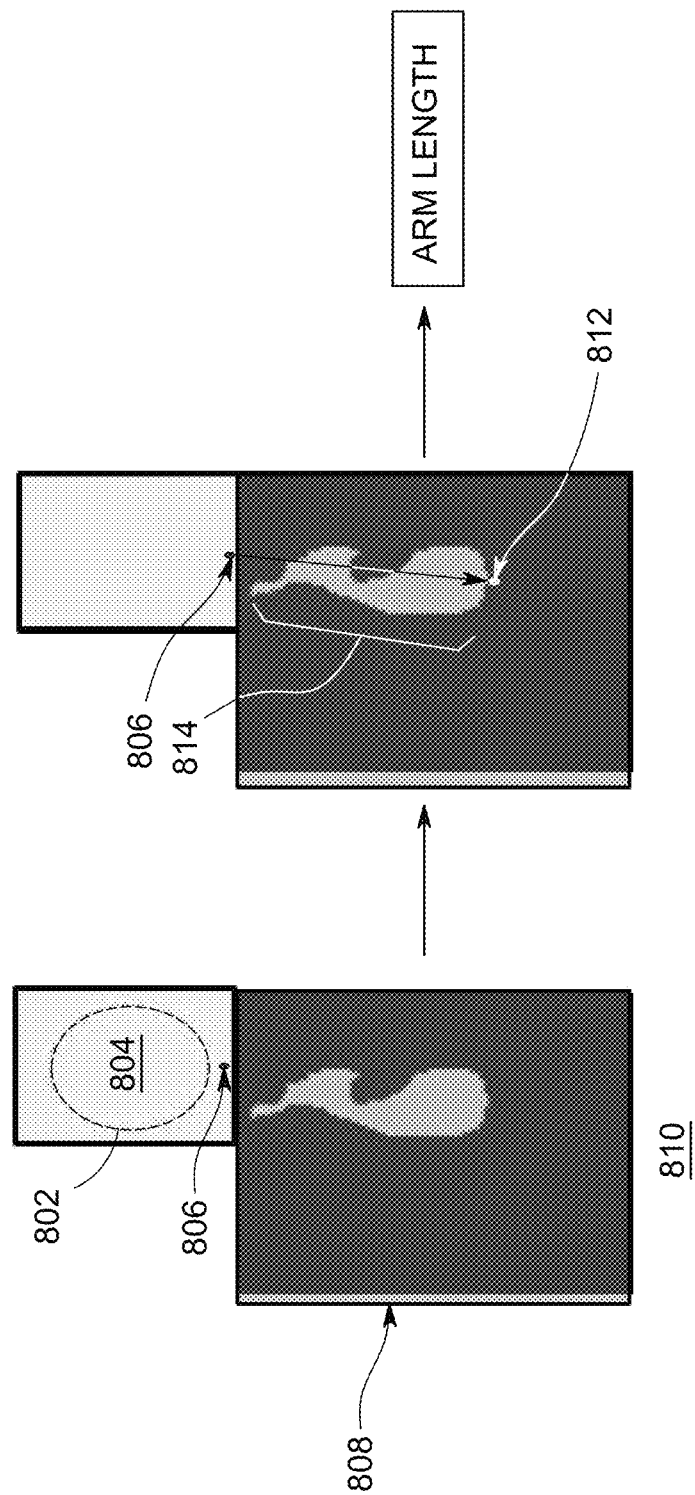
FIG. 8 illustrates processing of the noise filtered image mask of FIG. 7B for estimation of an arm length according to exemplary embodiments of the present invention.

FIG. 8 illustrates processing of the noise filtered image mask of FIG. 7B to estimate the arm length according to exemplary embodiments of the present invention.

A hand area tracking region 802, i.e., a tracking area L² of length L and height L, where L is the detected hand length, comprises a hand area 804 and a selected bottom position 806 of the hand area 804. An image differencing computation region 808, i.e., an area 4 L² of length 2 L and height 2 L, comprises a filtered image mask 810 and a found elbow position 812. The found elbow position 812 is farthest along the arm mask boundary starting from the selected bottom position 806. An estimated arm length 814 is the distance between the selected bottom position 806 and the found elbow position 812. In some embodiments, if estimated arm length 814 exceeds a predefined parameter dependent on a detected hand length the estimated arm length is truncated to a predefined length. In some embodiments, the predefined length is 1.5 times the detected hand length.

Figure 9:
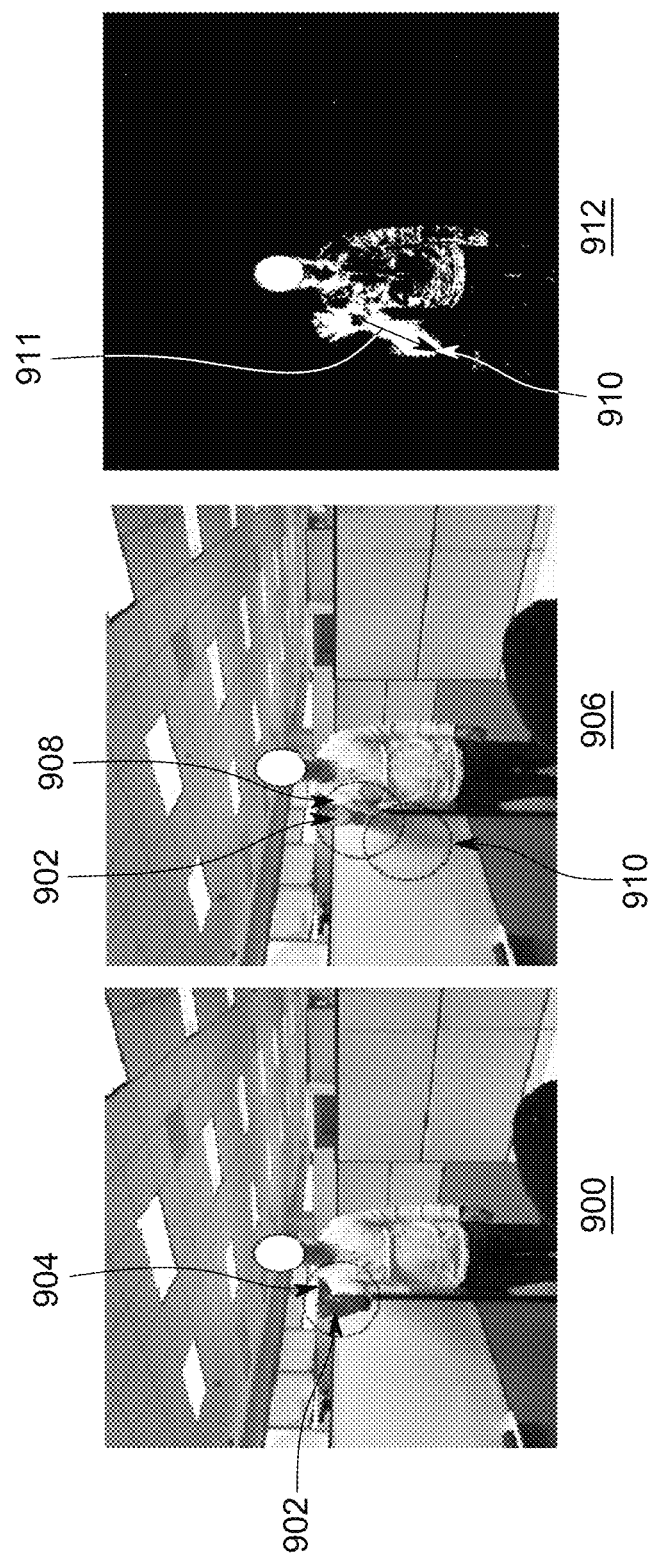
FIG. 9 illustrates how a shadow can result in an incorrect arm length determination.

FIG. 9 illustrates a difference image which does not account for shadows in the original images, and therefore may result in an incorrect arm length determination. FIG. 9 illustrates a new first image of an arm in a new first position, a new second image 906 of the arm in a new second position and a difference image 912 showing an incorrect arm length due to a shadow.

A first image 900 comprises an arm 902 in a first position 904. In some embodiments, the arm 902 is in a stretched horizontal pose in the new first position 904. A second image 906 comprises the arm 902 in a second position 908 and a shadow 910, i.e. the shadow of the arm 902 in the second position 908. A difference image 912 shows an incorrectly estimated arm length 911 due to a lower end of the shadow 910 being erroneously determined as the position 812 of the elbow.

Figure 10:
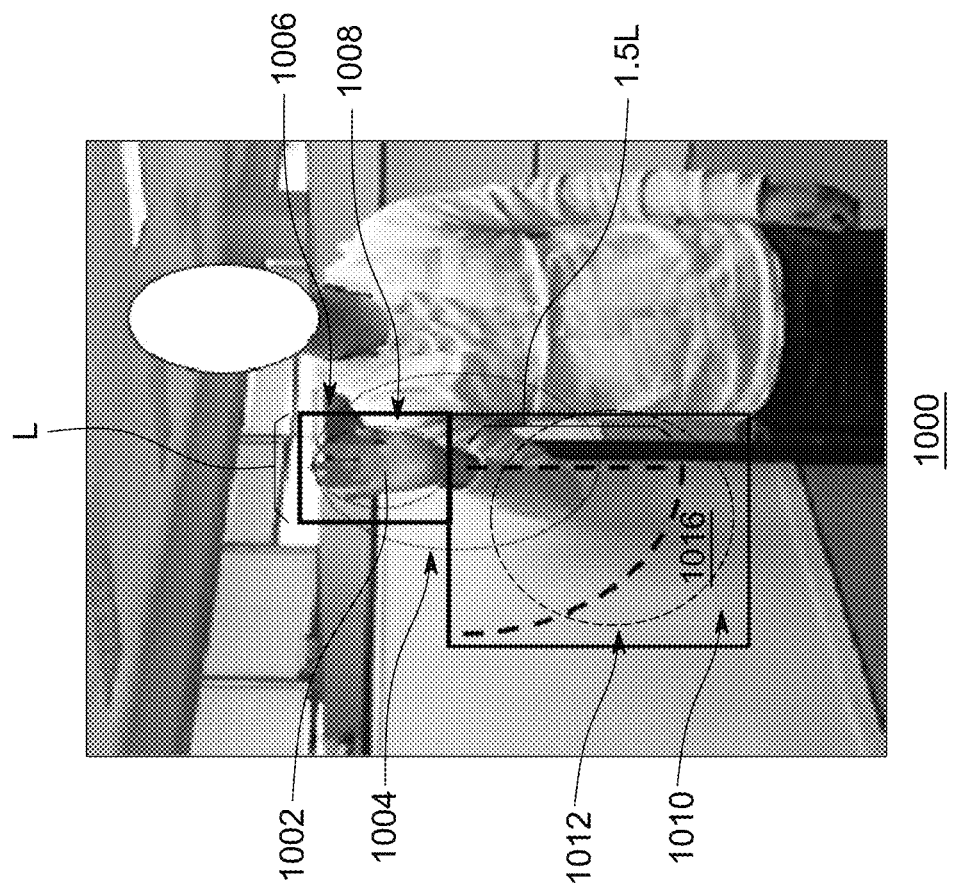
FIG. 10 illustrates removal of shadow, thereby resulting in a correct arm length determination according to exemplary embodiments of the present invention.

FIG. 10 illustrates how appearance of arm shadow in the image mask is reduced, thereby resulting in a correct arm length determination according to exemplary embodiments of the present invention. In FIG. 10 an input image of an arm in a given position is shown, in which an elbow movement area is divided into a likely area to include the elbow and a likely area to include a shadow according to exemplary embodiments of the present invention.

The input image 1000 comprises a hand 1002 in a given position 1004, a hand area tracking region 1006 and an image differencing computation region 1010. In some embodiments, the hand 1002 is in an upright (or vertical) pose in the position 1004. The hand area tracking region 1006 comprises a hand area 1008. The image differencing computation region 1010 comprises an elbow movement region 1012. The elbow movement region 1012 is divided into an elbow likely area 1014 and a shadow likely area 1016.

Figure 11:
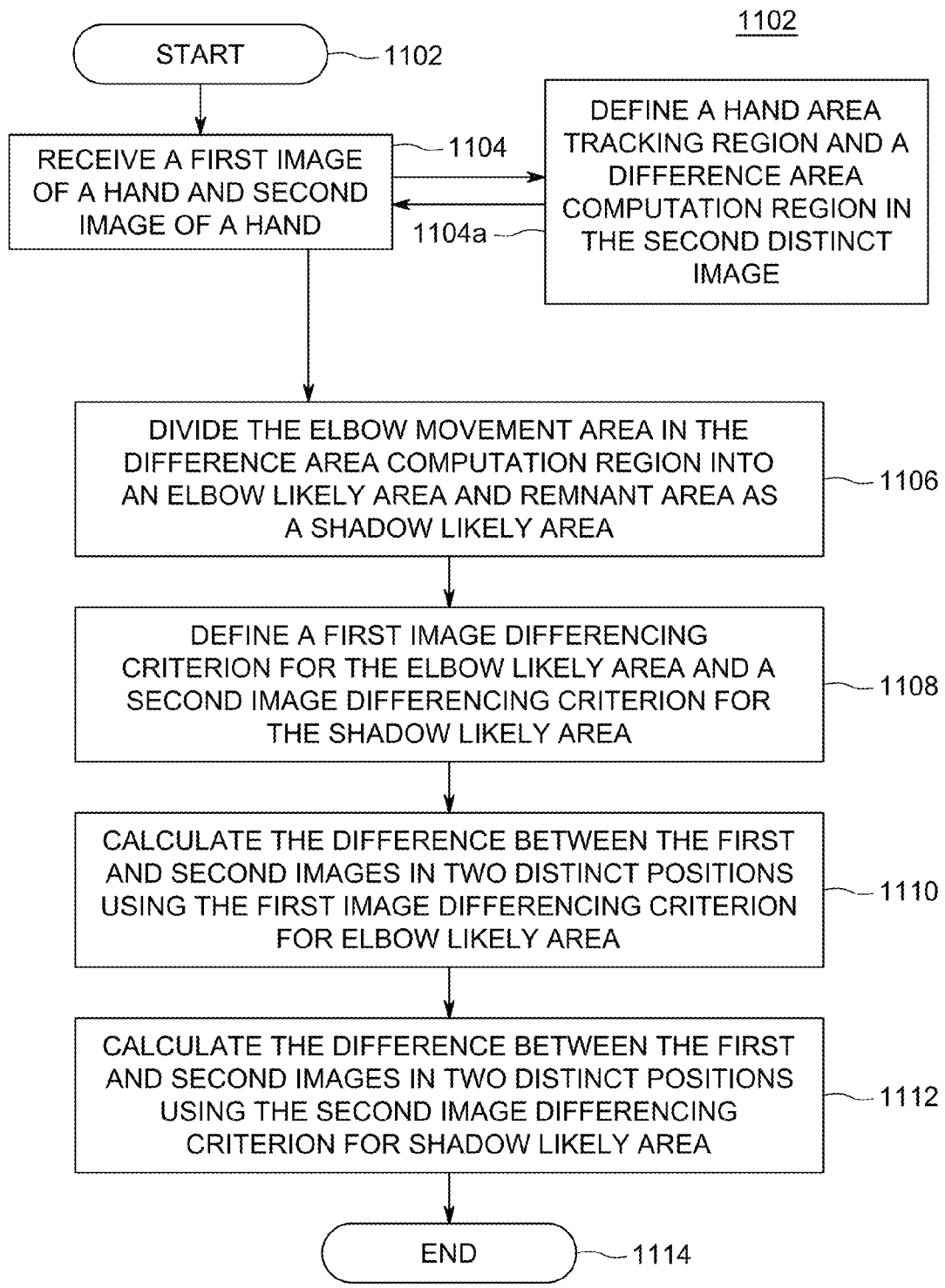
FIG. 11 illustrates a flow diagram of a method for removing error in an estimated arm length due to shadow according to exemplary embodiments of the present invention.

FIG. 11 is an illustration of a flow diagram for a method for removing error in an estimated arm length due to shadow according to exemplary embodiments of the present invention. The method 1100 is an implementation of the shadow removal module 108 shown in FIG. 1 and the elbow movement area described in FIG. 10, implemented as the shadow removal module 228 executed by the processor 202. The method 1100 begins at step 1102 and proceeds to step 1104.

At step 1104, the shadow removal module 228 receives two input images, i.e. a first image of an arm in a stretched horizontal position and a second image of the arm in an upright (or vertical) position. Within step 1104a, the method 1100 defines a hand area tracking region and a difference area computation region in the second image of the hand in a folded upright (or vertical) position. In some embodiments, the hand area tracking region has an area of L² and the difference area computation region has an area of 4 L², where L is the detected hand length.

At step 1106, the shadow removal module 228 divides the elbow movement area 1012 as shown in FIG. 10 in the difference area computation region into an elbow likely area 1014 and remnant area as a shadow likely area 1016. In some embodiments, the elbow likely area 1014 is an arc of radius 1.5 L.

At step 1108, the shadow removal module 228 defines one image differencing criterion corresponding to each of the elbow likely area 1014 and the shadow likely area 1016. Specifically, the shadow removal module 228 defines a first image differencing criterion corresponding to the elbow likely area. The first image differencing criterion is represented by a first pair of equation, namely Equations 1 and 2:

$$I_{DIFF}(x,y)=1, \text{ if } |I_{1Y}(x,y)-I_{2Y}(x,y)|+|I_{1U}(x,y)-I_{2U}(x,y)|+|I_{1V}(x,y)-I_{2V}(x,y)|>25; \quad \text{Equation 1}$$

$$I_{DIFF}(x,y)=0, \text{ otherwise.} \quad \text{Equation 2}$$

where Y is the luma component (i.e., brightness), and U and V are chroma (or color) components.

Likewise, the shadow removal module 228 defines a second image differencing criterion corresponding to the shadow likely area. The second image differencing criterion is represented by a second pair of equation, namely Equations 3 and 4:

$$I_{DIFF}(x,y)=1, \text{ if } |I_{1U}(x,y)-I_{2U}(x,y)|>7.5 \text{ or } |I_{1V}(x,y)-I_{2V}(x,y)|>7.5; \quad \text{Equation 3}$$

$$I_{DIFF}(x,y)=0, \text{ otherwise.} \quad \text{Equation 4}$$

where Y is brightness, i.e., Y is very sensitive to lighting change and shadows. Two chroma components (U and V) are used while computing the mask to determine whether motion exists in the background because the shadow pixels have color components similar to the background pixels.

The shadow removal module 228 calculates the difference between the two distinct images of the arm in two positions, captured during the movement of the hand between the two distinct positions. At step 1110, the shadow removal module 228 calculates the difference between the two distinct images in two distinct positions using the first image differencing criterion for the elbow likely area 1014.

At step 1112, the shadow removal module 228 calculates the difference between the two distinct images in two distinct positions using the second image differencing criterion for the shadow likely area 1016. The resultant image mask is used by the elbow position computation module 224 of FIG. 2 in order to more accurately determine the position of the elbow in the presence of shadow. The method 1100 terminates at step 1114.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for gesture recognition using a two dimensional (2D) imaging device comprising:
   capturing a first image of an arm in a first position;
   capturing a second image of the arm in a second position;
   generating an image mask for indicating movement of the arm from the first position to the second position;
   determining an elbow position of the arm based on the image mask; and
   estimating a change in depth of the arm from the first position to the second position based on the determined elbow position.

2. The method of claim 1, wherein capturing the first and second images further comprises:
   segregating a hand area in each of the first image and the second image based on skin color and motion information;
   defining a first region for the hand area segregated in each of the first and second images;
   defining a second region for calculation of a difference between the first and second images;
   computing a difference area between the first and second images in the second region using image differencing;
   determining whether the difference area is greater than the hand area; and
   substituting the first image with the second image if the difference area is greater than the hand area.

3. The method of claim 1, wherein generating the image mask further comprises:
   convolving pixels the image mask using a filter for removal of noisy pixels to generate a filtered image mask.

4. The method of claim 2, wherein determining the elbow position of the arm based on the image mask further comprises:
   segregating a hand area in each of the first image and the second image so as to provide at least a bottom of a hand area in the image mask; and
   finding a pixel position for the elbow in the image mask that is farthest along a boundary of the image mask starting from a pixel position corresponding to the bottom of the hand area in the image mask.

5. The method of claim 4, further including:
   computing an arm length as the distance in the image mask between the pixel position found for the elbow in the image mask and the pixel position corresponding to bottom of the hand area;
   determining whether the arm length exceeds a predefined parameter dependent on a detected length of the hand area in one of the first image and the second image; and
   truncating the arm length to equal the predefined parameter if the computed arm length exceeds the predefined parameter.

6. The method of claim 5, wherein determining the elbow position comprises finding in the image mask a pixel with a pair of rectangular coordinates (x, y) in which x is the abscissa and y is the ordinate, which is confined to the second region.

7. The method of claim 6, wherein the bottom of the hand area is confined to the first region.

8. The method of claim 5, further comprising:
   processing the first and second images to remove errors due to shadows in the arm length, comprising:
   dividing an area for indicating movement of the elbow into a first and a second portion;
   calculating the difference in the first and second images based on a first criterion for the first portion; and
   calculating the difference in the first and second images based on a second criterion for the second portion.

9. The method of claim 8, wherein the first portion comprises a likely area for the elbow and the second portion comprises a likely area for the shadow.

10. An apparatus for gesture recognition using a two dimensional (2D) imaging device comprising:
    the imaging device for capturing a first image of an arm in a first position and capturing a second image of the arm in a second position;
    an image mask module for generating an image mask for indicating movement of the arm from the first position to the second position;
    an elbow position module for determining an elbow position of the arm based on the image mask; and
    an arm length estimation module for estimating the change in depth of the arm from the first position to the second position based on the determined elbow position.

11. The apparatus of claim 10, wherein the imaging device further comprises:
    a skin color module for segregating a hand area in each of the first image and the second image based on skin color and motion information, defining a first region for the hand area segregated in each of the first and second images, defining an second region for calculation of a difference between the first and second images, computing a difference area between the first and second images in the second region using image differencing, determining whether the difference area is greater than the hand area; and substituting the first image with the second image if the difference area is greater than the hand area.

12. The apparatus of claim 10, wherein the image mask module further comprises:
    a convolution filter for removal of noisy pixels by convolving and filtering the image mask.

13. The apparatus of claim 11, wherein the elbow position module further:
  finds a pixel position for the elbow in the image mask that is farthest along an arm length starting from a bottom of the hand area.

14. The apparatus of claim 13, wherein the elbow position module further computes the arm length as the distance between the pixel position for the elbow and the bottom of the hand area, determines whether the computed arm length exceeds a predefined parameter; and truncates the computed arm length to equal the predefined parameter if the computed arm length exceeds the predefined parameter.

15. The apparatus of claim 13, wherein the predefined parameter is a multiple of a detected length of the hand area in one of the first and second images.

16. The apparatus of claim 13, wherein determining the elbow position comprises finding a pixel with a pair of rectangular coordinates (x, y) in which x is the abscissa and y is the ordinate, which is confined to the second region.

17. The apparatus of claim 13, wherein the bottom of the hand area is confined to the first region.

18. The apparatus of claim 14, further comprising a shadow removal module for processing the first and second images to remove errors due to shadows in the computed arm length, comprising, dividing an area for the movement of the elbow into a first and a second portion, calculating the difference in the first and second images based on a first criterion for the first portion and calculating the difference in the first and second images based on a second criterion for the second portion.

19. The apparatus of claim 18, wherein the first portion comprises a likely area for the elbow and the second portion comprises a likely area for the shadows.

20. The apparatus of claim 10, further comprising a shadow removal module for processing the first and second images to remove errors due to shadows when determining the elbow position, comprising, dividing an area for the movement of the elbow into a likely area for the elbow and a likely area for the shadow, calculating the difference in the first and second images based on a first criterion for the likely area for the elbow and calculating the difference in the first and second images based on a second criterion for the likely area for the shadow.

* * * * *